July 12, 1949.  B. S. PRESTON  2,475,720
TILTABLE MEASURING TRAP FOR BOTTLES
Filed Aug. 24, 1945
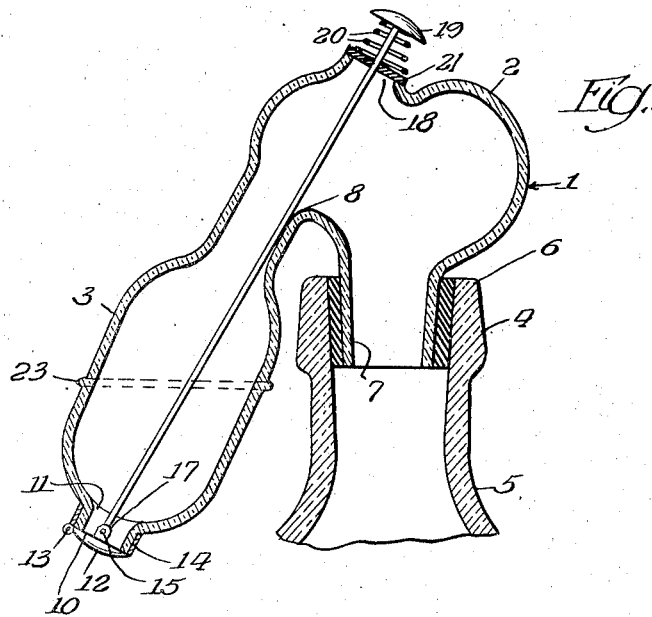
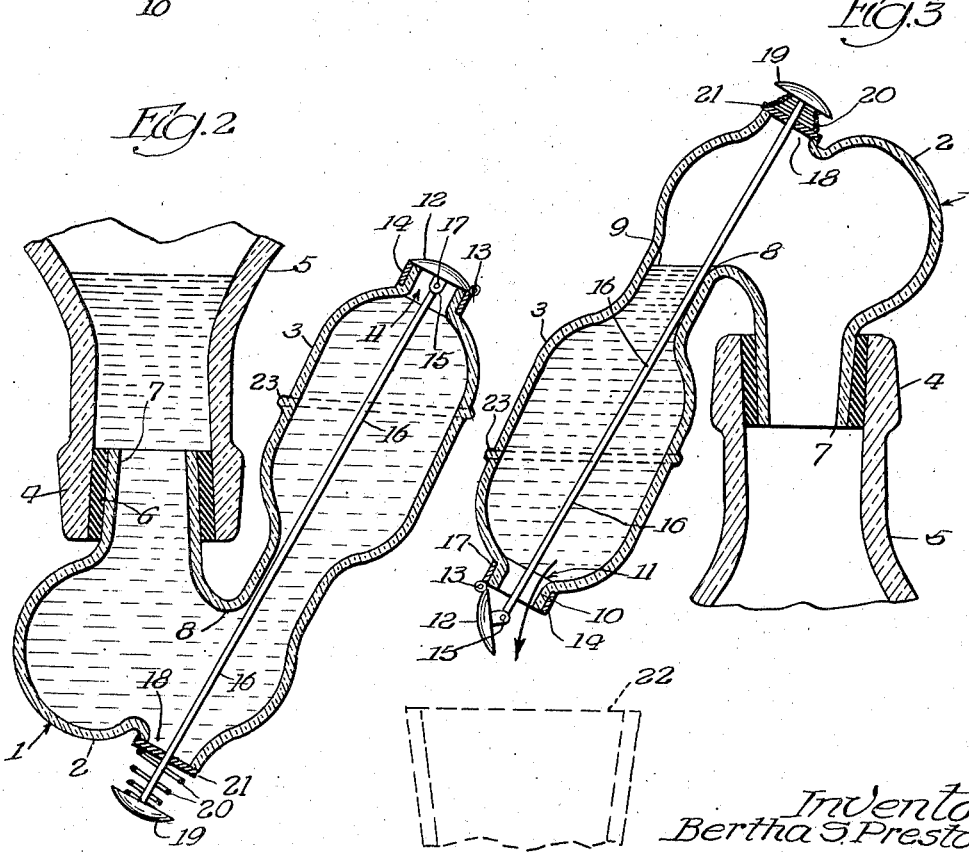
Inventor:
Bertha S. Preston
By Spencer, Marzall, Johnston & Cook
attys.

Patented July 12, 1949

2,475,720

UNITED STATES PATENT OFFICE 2,475,720

TILTABLE MEASURING TRAP FOR BOTTLES

Bertha S. Preston, Chicago, Ill.

Application August 24, 1945, Serial No. 612,339

1 Claim. (Cl. 222—456)

This invention relates to measuring devices in general and particularly to measuring devices for measuring a predetermined quantity of liquid, such as liquors, extracts, concentrates and the like.

The primary object of the present invention is to provide an efficient, accurate measuring device which can be removably secured to the neck of a bottle whereby a predetermined quantity of liquid, such as liquor, extract and the like, may be definitely measured by tilting the bottle and then dispensed at a later time by operating a spring controlled plunger which controls the operation of an outlet from the end of the measuring device.

Another important object of the invention consists in the provision of an elongated hollow measuring device communicating with a chamber with which the measuring device has cooperation whereby a predetermined quantity of liquid may be received in the measuring device when the bottle is tilted and subsequently released from the measuring device upon pressing a spring controlled member.

Numerous other objects and advantages will be apparent throughout the progress of the following specification.

The accompanying drawing illustrates a selected embodiment of the invention and the views therein are as follows:

Fig. 1 is a detail vertical sectional view of the improved measuring device mounted on the neck of a bottle containing liquid;

Fig. 2 is a view similar to Fig. 1 but shows the device in an inverted position whereby the measuring device will be completely filled with fluid; and Fig. 3 is a view similar to Fig. 1 showing a predetermined quantity of liquid contained in the measuring device.

The particular construction herein shown for the purpose of illustrating the invention comprises a one piece unitary stopper 1. The stopper 1 has a bulbous hollow upper portion or body 2 which terminates in a tubular measuring end or portion 3. The parts 2 and 3 are preferably made of clear glass but other materials may be used, such as plastic. While it is desirable that the device be clear so that the fluid contained therein may be readily seen, it may be made opaque.

The hollow measuring part or cup 3 communicates with the hollow bulbous top part 2 through a connecting passage of appreciably reduced cross section relative to the parts 2 and 3.

The device 1 is inserted in the neck 4 of a bottle 5, there being a flexible gasket or member 6 arranged between the inside of the neck of the bottle and the outside of the neck 7 of the device 1 whereby the device 1 has a liquid-tight seal with the bottle 5.

The neck 7 of the device 1, which is complementally interconnected with the neck 4 of bottle 5, extends upwardly a predetermined distance, as indicated at 8, whereby the bottle when tilted will fill the part 3 with liquid to the point indicated at 9 when the device is in its upright position, Fig. 3. The lower end of the part 3 extends well below the neck 7 and terminates in an annular extension 10 surrounding the outlet 11.

The outlet 11 is closed by a valve 12 hingedly connected at 13 to a holding collar 14. The valve 12 includes an inwardly extending projection 15 to which an operating member 16 is connected as indicated at 17. The upper end of the member 16 extends through an opening 18 provided in the upper end of the body 2 at a point over the neck 4 and terminates in a button or like element 19. The button 19 is normally urged in upward position by a coil spring 20.

If desired, a washer 21 may be inserted beneath the button and engageable about the opening 18 to normally close the opening, the operating member 16 having slidable movement through the washer-like element 21.

The button 19 is adapted to be pressed against the urging action of the spring 20 whereupon the valve 12 is swung on its pivot 13 so as to permit the flow of fluid in the part 3 to pass out the outlet 11 into a glass or other receptacle 22, Fig. 3.

The device is adapted to be mounted on a bottle as shown in Fig. 1 and, when the bottle is tipped, fluid will pass from the bottle into the part 3. The bottle when returned to upright position, as shown in Fig. 3, will cause the excess fluid to return to the bottle by filling the measuring part or tube 3 to the point indicated at 9.

The fluid line, indicated at 9, is at the same level as the part 8 of the neck 7. Fig. 2 shows the bottle 5 completely inverted but it is not necessary to turn the bottle completely upside down, it being only necessary to tilt the bottle sufficiently so that the tubular end or part 3 will be completely filled with liquid.

In operation the device 1 is inserted into the the neck of the bottle as clearly shown in Fig. 2. The bottle is then tipped sufficiently so that the fluid in the bottle will pass through the neck 7 and completely fill the part 3. The bottle is then returned to its upright position whereby the part 3 will be filled with a predetermined amount of liquid. The button 19 is then pressed against the urging action of the spring 20 whereupon the valve 12 is in open position as shown in Fig. 3, permitting the predetermined measured amount of liquid in the part 3 to be dispensed in a glass or other receptacle 22. The button is then released whereupon the spring 20 will urge the button upwardly to the position shown in Fig. 1 whereupon the valve 12 will close the outlet opening 11.

The device is of a unitary structure and is freely attachable to and removable as such from the outlet of the container. It is preferably made of glass and includes the body portion 2 which projects downwardly to provide a downwardly extending measuring part 3. The part 3 is provided with a normally closed valve which is operated by a spring pressed plunger element including a hand operating piece or button 19. The measuring device is of a predetermined size and shape and holds a predetermined quantity of liquid so that each time the button 19 is pressed, a definite predetermined quantity of liquid is dispensed through the outlet opening 11.

In cases where half the quantity or a portion thereof is desired to be dispensed, and assuming that the device is made of transparent material, such as glass, indications or graduations 23 may be provided so that the dispenser may dispense a part of the quantity in the part 3.

The device may be made ornamental and relatively inexpensive. It is efficient in operation and permits a definite quantity of liquid to be dispensed. The customer is thereby assured that a predetermined quantity of liquid is being given to him, and it is not necessary to rely on the dispenser to fill or partly fill the so-called conventional measuring glasses.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

A liquid measuring and dispensing device adapted to be detachably connected with the neck of a bottle or the like and comprising a one-piece stopper member, said stopper member being formed to provide an extended neck portion having its outer end shaped for complemental interconnection with the neck of a bottle or the like, an enlarged bulbous portion extending in approximate alignment with and from the inner end of said neck portion; an elongated passage portion of appreciably reduced cross section relative to said bulbous portion extending from one side of the bulbous portion in the direction of the neck portion and in acute angular relation therewith, and a tubular measuring portion lying well below said neck portion and extending as an enlarged continuation of said elongated passage portion, said tubular measuring portion having a dispensing opening in its lower end; an outwardly opening valve closure mounted over said dispensing opening; and a valve operating member connected with said valve closure and extending through the measuring portion, the elongated passage portion, and the bulbous portion, and out from the top of the bulbous portion at a point over said neck portion.

BERTHA S. PRESTON.

REFERENCES CITED

The following references are of record in the file of this patent:

UNITED STATES PATENTS

| Number | Name | Date |
|---|---|---|
| 368,257 | Tower | Aug. 16, 1887 |
| 547,862 | Platt | Oct. 15, 1895 |
| 639,881 | Bailey | Dec. 26, 1899 |
| 701,316 | Edwards | June 3, 1902 |
| 1,671,542 | Perks | May 29, 1928 |
| 1,748,191 | Roos | Feb. 25, 1930 |
| 2,385,195 | Clower | Sept. 18, 1945 |

FOREIGN PATENTS

| Number | Country | Date |
|---|---|---|
| 229,549 | Great Britain | Feb. 26, 1925 |